United States Patent
Uno et al.

(10) Patent No.: US 7,510,772 B2
(45) Date of Patent: Mar. 31, 2009

(54) FLUOROSILICONE RUBBER COMPOSITION AND MOLDED RUBBER ARTICLE

(75) Inventors: Takao Uno, Annaka (JP); Kenichi Takita, Annaka (JP); Susumu Sekiguchi, Tokyo (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 124 days.

(21) Appl. No.: 11/441,138

(22) Filed: May 26, 2006

(65) Prior Publication Data

US 2006/0281875 A1 Dec. 14, 2006

(30) Foreign Application Priority Data

May 30, 2005 (JP) ............................. 2005-157161

(51) Int. Cl.
B32B 9/04 (2006.01)
C08G 77/24 (2006.01)

(52) U.S. Cl. .................... 428/446; 428/447; 528/42
(58) Field of Classification Search ................. 525/477
See application file for complete search history.

(56) References Cited

U.S. PATENT DOCUMENTS

| | | | |
|---|---|---|---|
| 4,360,610 A * | 11/1982 | Murray et al. ............... 523/212 |
| 4,690,967 A * | 9/1987 | LaGarde et al. ............. 524/266 |
| 4,882,368 A * | 11/1989 | Elias et al. .................. 523/213 |
| 4,888,374 A * | 12/1989 | Takahashi et al. ........... 524/227 |
| 4,929,669 A * | 5/1990 | Jensen ........................ 524/861 |
| 4,992,521 A * | 2/1991 | Saho et al. .................... 528/14 |
| 5,059,648 A * | 10/1991 | Fukushima et al. .......... 524/376 |
| 5,059,668 A | 10/1991 | Fukuda et al. |
| 5,081,172 A * | 1/1992 | Chaffee et al. ............... 524/188 |
| 5,110,845 A * | 5/1992 | Gray et al. ................... 523/211 |
| 5,171,773 A * | 12/1992 | Chaffee et al. ............... 524/493 |
| 5,254,623 A * | 10/1993 | Watson ........................ 525/100 |
| 5,300,609 A * | 4/1994 | Kobayashi .................... 528/14 |
| 5,302,632 A * | 4/1994 | Maxson ....................... 523/213 |
| 5,342,879 A | 8/1994 | Takahashi et al. |
| 5,420,675 A * | 5/1995 | Thompson et al. ........... 399/237 |
| 5,486,551 A * | 1/1996 | Polmanteer ................. 523/212 |
| 5,547,742 A * | 8/1996 | Satoh et al. .................. 428/215 |
| 5,551,707 A * | 9/1996 | Pauley et al. ................ 277/654 |
| 5,569,698 A * | 10/1996 | Maxson ....................... 524/493 |
| 5,753,318 A * | 5/1998 | Eckberg et al. .............. 427/512 |
| 5,824,736 A * | 10/1998 | Kobayashi et al. .......... 524/588 |
| 5,854,310 A * | 12/1998 | Maxson ....................... 525/213 |
| 5,863,968 A * | 1/1999 | Irish et al. ................... 523/213 |
| 5,882,467 A * | 3/1999 | Sierawski et al. ............ 156/329 |
| 5,922,426 A * | 7/1999 | Nagatsuka et al. ....... 428/36.92 |
| 5,998,034 A * | 12/1999 | Marvil et al. ................. 428/422 |
| 6,022,904 A * | 2/2000 | Sollradl et al. ............... 521/154 |
| 6,084,002 A * | 7/2000 | Nicholson et al. ............ 521/91 |
| 6,232,379 B1 * | 5/2001 | Takita ......................... 524/266 |
| 6,297,302 B1 * | 10/2001 | Heeks et al. ................. 524/262 |
| 6,312,817 B1 * | 11/2001 | Chen et al. ................... 428/447 |
| 6,339,124 B1 * | 1/2002 | Igarashi et al. .............. 524/588 |
| 6,369,155 B1 | 4/2002 | Takita |
| 6,610,778 B2 * | 8/2003 | Takita et al. ................. 524/588 |
| 6,706,819 B1 * | 3/2004 | Araki et al. .................. 525/199 |
| 6,730,385 B1 * | 5/2004 | Tanaka et al. ............... 428/66.4 |
| 6,759,129 B2 * | 7/2004 | Fukushi ....................... 428/412 |
| 6,926,924 B2 | 8/2005 | Katayama et al. |
| 7,278,639 B2 * | 10/2007 | Forry et al. .................. 277/596 |
| 2001/0016609 A1 * | 8/2001 | Meguriya et al. ............. 521/54 |
| 2002/0013389 A1 * | 1/2002 | Taylor et al. .................. 524/59 |
| 2002/0061953 A1 * | 5/2002 | Takita et al. ................. 524/435 |
| 2002/0137838 A1 * | 9/2002 | Silvi et al. .................... 524/588 |
| 2003/0118765 A1 * | 6/2003 | Govaerts et al. .......... 428/36.91 |
| 2003/0198769 A1 * | 10/2003 | Jing et al. ................. 428/36.91 |
| 2003/0207118 A1 * | 11/2003 | Fukushi ....................... 428/421 |
| 2004/0157035 A1 * | 8/2004 | Guizzetti et al. ........... 428/66.6 |
| 2004/0235994 A1 * | 11/2004 | Okamoto et al. ............ 524/261 |
| 2004/0236014 A1 * | 11/2004 | Ota et al. ..................... 524/861 |
| 2006/0182914 A1 * | 8/2006 | Yasumatsu et al. ......... 428/36.8 |

FOREIGN PATENT DOCUMENTS

| | | |
|---|---|---|
| EP | 0 551 211 A1 | 7/1993 |
| JP | 62-174260 A | 7/1987 |
| JP | 5-186700 A | 7/1993 |
| JP | 2000-26735 A | 1/2000 |
| JP | 2001-2923 A | 1/2001 |
| JP | 2002-317885 A | 10/2002 |

OTHER PUBLICATIONS

Fluorosilicone Liquid Silicone Rubber, International Silicone Conference, Akron, Ohio, 2003 (http://www.dowcorning.co.kr/ko_KR/content/publishedlit/45-1237.pdf?popup=true).*

* cited by examiner

Primary Examiner—Randy Gulakowski
Assistant Examiner—Robert Loewe
(74) Attorney, Agent, or Firm—Birch, Stewart, Kolasch & Birch, LLP

(57) ABSTRACT

A fluorosilicone rubber composition is provided comprising (A) a first organopolysiloxane having the formula: $R^1_a R^2_b R^3_c SiO_{(4-a-b-c)/2}$ wherein $R^1$ is trifluoropropyl, $R^2$ is an aliphatic unsaturated hydrocarbon group, $R^3$ is an aliphatic saturated hydrocarbon or aromatic hydrocarbon group, (B) a silica filler, (C) a second organopolysiloxane having formula (2) wherein $R^4$ is an aliphatic unsaturated hydrocarbon group or the like, and (D) a cure catalyst. The fluorosilicone rubber composition affords satisfactory adhesion at the interface with dimethylsilicone rubber even when the molding pressure is low.

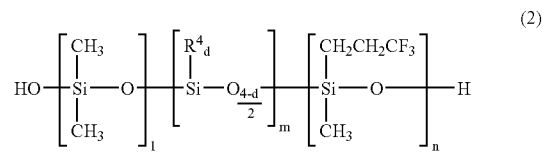

13 Claims, No Drawings

FLUOROSILICONE RUBBER COMPOSITION AND MOLDED RUBBER ARTICLE

CROSS-REFERENCE TO RELATED APPLICATION

This non-provisional application claims priority under 35 U.S.C. §119(a) on Patent Application No. 2005-157161 filed in Japan on May 30, 2005, the entire contents of which are hereby incorporated by reference.

TECHNICAL FIELD

This invention relates to fluorosilicone rubber compositions, and more particularly, to fluorosilicone rubber compositions which are fully adherent to dimethylsilicone rubber, and molded rubber articles.

BACKGROUND ART

Because of heat resistance, freeze resistance, oil resistance, fuel oil resistance and compression recovery, fluorosilicone rubber is widely used as parts for automobiles, aircraft and other transporting vehicles and parts for petroleum-related equipment. When used as automobile parts, especially turbocharger hoses, fluorosilicone rubber is often molded into a two-layer structure of dimethylsilicone rubber and fluorosilicone rubber. Specifically, on the hose inner side where oil resistance is required, fluorosilicone rubber is selected. On the hose outer side, dimethylsilicone rubber is selected for restitution and wiping resistance. This results in a whole hose having a two-layer structure of fluorosilicone rubber and dimethylsilicone rubber. However, due to a difference in compatibility between fluorosilicone rubber and dimethylsilicone rubber, the structure shows very poor adhesion at the interface when processed by steam vulcanization and hot air vulcanization (HAV) using a low pressure during molding, leaving a likelihood of interfacial separation. In press molding and similar molding processes capable of applying a certain pressure during molding, co-vulcanization occurs at the interface to achieve co-adhesion, reducing the likelihood of interfacial separation. For the molding of hoses, however, steam vulcanization and HAV processes are adequate.

Thus there exists a demand for a fluorosilicone rubber composition which is improved in interfacial adhesion to dimethylsilicone rubber when processed by steam vulcanization and HAV using a low pressure during molding, and a fluorosilicone rubber composition which can be blended with a dimethylsilicone rubber composition at any proportion while restraining the risk of interlaminar peeling or delamination in a microscopic region.

Reference should be made to JP-A 2002-317885, JP-A 2001-002923 (U.S. Pat. No. 6,369,155), JP-A 5-186700 (U.S. Pat. No. 5,342,879, EP 551211), and JP-A 2000-026735.

DISCLOSURE OF THE INVENTION

An object of the present invention is to provide a fluorosilicone rubber composition which when molded together with a dimethylsilicone rubber composition to form a two-layer structure even by steam vulcanization and HAV using a low pressure during molding, exhibits improved interfacial adhesion between fluorosilicone rubber and dimethylsilicone rubber and which when blended with a dimethylsilicone rubber composition, restrains delamination in a microscopic region.

The inventor has found that a fluorosilicone rubber composition comprising (A) a first organopolysiloxane of the average compositional formula (1), shown below, having a degree of polymerization of 500 to 20,000, (B) a silica filler, and (D) a cure catalyst is improved by compounding therein a specific amount of (C) a second organopolysiloxane of the average formula (2), shown below, having a viscosity of up to 2,000 mPa·s at 25° C.; that when molded together with a dimethylsilicone rubber composition to form a two-layer structure even by steam vulcanization and HAV using a low pressure during molding, the resulting fluorosilicone rubber composition exhibits improved interfacial adhesion between fluorosilicone rubber and dimethylsilicone rubber after curing; and that the resulting fluorosilicone rubber composition can be blended with a dimethylsilicone rubber composition at any proportion while restraining delamination in a microscopic region and preventing any reduction of tensile strength.

Accordingly, the present invention provides a fluorosilicone rubber composition comprising (A) 100 parts by weight of a first organopolysiloxane having the average compositional formula (1):

wherein $R^1$ is trifluoropropyl, $R^2$ is a substituted or unsubstituted, monovalent aliphatic unsaturated hydrocarbon group of 2 to 8 carbon atoms, $R^3$ is an unsubstituted, monovalent aliphatic saturated hydrocarbon group of 1 to 8 carbon atoms or an aromatic hydrocarbon group, a, b and c are positive numbers satisfying $0.96 \leq a \leq 1.01$, $0.0001 \leq b \leq 0.005$, $0.96 \leq c \leq 1.06$, and $1.98 \leq a+b+c \leq 2.02$, said first organopolysiloxane having a degree of polymerization of 500 to 20,000, (B) 2 to 100 parts by weight of a silica filler, (C) 0.1 to 10 parts by weight of a second organopolysiloxane having the average formula (2):

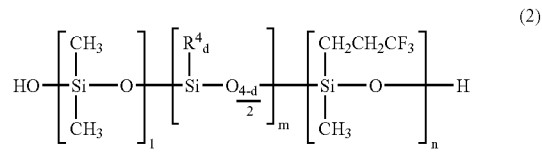

wherein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, an aromatic hydrocarbon group of 6 to 10 carbon atoms or a hydroxyl group, d is an integer of 0 to 2, l, m and n are each independently a positive number, said second organopolysiloxane having a viscosity of up to 2,000 mPa·s at 25° C., and (D) a catalytic amount of a cure catalyst.

In a preferred embodiment, the composition may further comprise (E) 0.1 to 10 parts by weight of an organosilane having the general formula (3):

wherein X is a functional group other than alkoxy, Y is an alkoxy group, and e is an integer of 0 to 2, said organosilane having a viscosity of up to 100 mPa·s at 25° C.

Preferably, component (C) is an organopolysiloxane having formula (2) wherein d is 0 or 1.

The composition is often used in lamination or blend with dimethylsilicone rubber.

In another aspect, the invention provides a molded rubber article comprising a fluorosilicone rubber and a dimethylsilicone rubber laid thereon. One or both of the rubber compositions of which the fluorosilicone rubber and the dimethylsilicone rubber are made comprise an organosiloxane having the average formula (2):

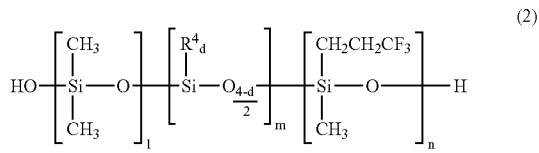

wherein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, an aromatic hydrocarbon group of 6 to 10 carbon atoms or a hydroxyl group, d is an integer of 0 to 2, 1, m and n are each independently a positive number, said organosiloxane having a viscosity of up to 2,000 mPa·s at 25° C.

BENEFITS OF THE INVENTION

When a fluorosilicone rubber composition is molded together with a dimethylsilicone rubber composition to form a two-layer structure even by steam vulcanization and HAV using a low pressure during molding, the invention improves the interfacial adhesion between fluorosilicone rubber and dimethylsilicone rubber after curing.

DESCRIPTION OF THE PREFERRED EMBODIMENT

Component A

Component (A) of the fluorosilicone rubber composition according to the invention is an organopolysiloxane represented by the following average compositional formula (1):

$$R^1_a R^2_b R^3_c SiO_{(4-a-b-c)/2} \qquad (1)$$

wherein $R^1$ is trifluoropropyl, $R^2$ is a substituted or unsubstituted, monovalent aliphatic unsaturated hydrocarbon group of 2 to 8 carbon atoms, $R^3$ is an unsubstituted, monovalent aliphatic saturated hydrocarbon group of 1 to 8 carbon atoms or an aromatic hydrocarbon group, a, b and c are positive numbers satisfying $0.96 \leq a \leq 1.01$, $0.0001 \leq b \leq 0.005$, $0.96 \leq c \leq 1.06$, and $1.98 \leq a+b+c \leq 2.02$.

Specifically, $R^1$ is trifluoropropyl. $R^2$ stands for substituted or unsubstituted monovalent aliphatic unsaturated hydrocarbon groups of 2 to 8 carbon atoms, preferably 2 to 4 carbon atoms, for example, alkenyl groups such as vinyl, allyl, propenyl, butenyl and hexenyl. $R^3$ stands for unsubstituted, monovalent aliphatic saturated hydrocarbon groups of 1 to 8 carbon atoms or aromatic hydrocarbon groups, for example, alkyl groups such as methyl, ethyl, propyl, butyl and hexyl, aryl groups of 6 to 10 carbon atoms such as phenyl and tolyl and aralkyl groups such as benzyl. Letter a is a number of 0.96 to 1.01, b is a number of 0.0001 to 0.005, c is a number of 0.96 to 1.06, and the sum of a+b+c ranges from 1.98 to 2.02.

In this organopolysiloxane, at least two aliphatic unsaturated hydrocarbon groups represented by $R^2$ should be included per molecule. It is preferred that alkenyl, especially vinyl account for 0.02 to 1 mol % based on the total moles of $R^1$, $R^2$ and $R^3$. $R^2$ may be located at ends of the backbone, side chains or both ends and side chains. If the vinyl content is more than 1 mol %, the composition will cure into a rubber which may have a hardness increased above the practical level or become brittle, losing mechanical strength such as tensile strength and tear strength. The organopolysiloxane (A) is generally end-capped with a triorganosilyl or silanol group (diorganohydroxysilyl group).

The organopolysiloxane (A) should have a degree of polymerization of 500 to 20,000 and preferably 1,000 to 10,000. With a degree of polymerization of less than 500, the composition tends to lose mechanical strength. In excess of 20,000, the composition becomes less workable.

The organopolysiloxane of the general formula (1) can be prepared, for example, by effecting ring-opening polymerization of tri(trifluoropropyl)trimethylcyclotrisiloxane using a siloxane oligomer of formula (4) as an initiator, as disclosed in JP-A 62-174260.

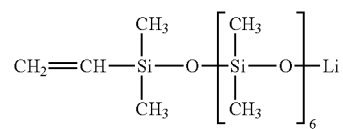

Component B

Component (B) is a silica filler. For a practically acceptable mechanical strength, the silica should preferably have a specific surface area of at least 50 m²/g, and more preferably 100 to 400 m²/g as measured by the BET method. Exemplary silica fillers are fumed silica (dry silica), fired silica and precipitated silica (wet silica), alone or in admixture of two or more. These silica fillers may be surface treated with surface treating agents such as chain organopolysiloxanes, cyclic organopolysiloxanes, organopolysilazanes, organochlorosilanes, and alkoxysilanes so as to be hydrophobic.

An appropriate amount of the silica filler blended is 2 to 100 parts, preferably 5 to 60 parts by weight per 100 parts by weight of component (A), first organopolysiloxane. Less than 2 parts of the filler is too small to achieve reinforcement whereas more than 100 parts of the filler has negative impact on workability and the physical properties of cured silicone rubber.

Component C

Component (C) is a second organopolysiloxane having the average formula (2), which may be used alone or in admixture of two or more.

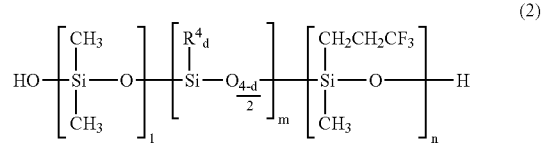

Herein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, an aromatic hydrocarbon group of 6 to 10 carbon atoms or a hydroxyl group, d is an integer of 0 to 2, 1, m and n are each independently a positive number. The organopolysiloxanes as components (A) and (C) are referred herein as first and second organopolysiloxanes, respectively, just for a distinguishing purpose.

The second organopolysiloxane (C) is the most important component in accomplishing adhesion at the interface between fluorosilicone rubber and dimethylsilicone rubber. Although the exact mechanism is unknown, interfacial adhesion is accomplished for the following reason. The second organopolysiloxane of formula (2) possesses in a molecule a moiety of structural formula (5) having affinity to dimethylpolysiloxane and a moiety of structural formula (6) having affinity to the first organopolysiloxane having trifluoropropyl groups (A). When the second organopolysiloxane is compounded in a fluorosilicone rubber composition, a moiety of structural formula (7) exists preferentially at the interface, providing the fluorosilicone rubber with a greater affinity to dimethylsilicone rubber at the interface. Also, when the second organopolysiloxane of formula (2) is compounded in a dimethylsilicone rubber composition, a moiety of structural formula (8) exists, providing the dimethylsilicone rubber with a greater affinity to fluorosilicone rubber at the interface. Then, equivalent effects of improving interfacial adhesion are expected whether the second organopolysiloxane of formula (2) is added to either the fluorosilicone composition or the dimethylsilicone composition. Accordingly, the second organopolysiloxane of formula (2) may be compounded in either the fluorosilicone composition of the invention or the dimethylsilicone composition to be described later. Because of a greater compatibility with dimethylsilicone compositions than conventional fluorosilicone rubber compositions, the fluorosilicone composition of the invention may be used in blend with dimethylsilicone without undergoing delamination.

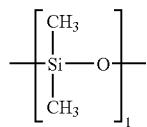
(5)

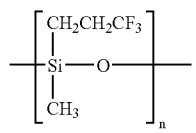
(6)

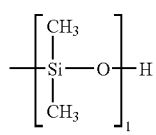
(7)

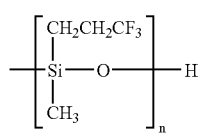
(8)

The second organopolysiloxane (C) should have a viscosity of up to 2,000 mPa·s at 25° C., and preferably 5 to 1,000 mPa·s at 25° C. Specifically, it is preferred in formula (2) that subscript 1 be a number in the range of 1 to 50, m be a number in the range of 1 to 50, and n be a number in the range of 1 to 50. If each subscript is beyond the range, the second organopolysiloxane is less dispersive when added to rubber compounds, negating the preferential presence at the surface of a moiety having one functional group and preventing its effect from being exerted on interfacial adhesion. Additionally, the proportion of randomly arranged moieties of structural formulae (5) and (6) increases, also preventing their effect from being exerted on interfacial adhesion. To attain the objects of the invention, a structure including the moieties of structural formulae (5) and (6) as respective blocks is preferred. More preferred is a structure in which the moieties of structural formulae (5) and (6) wherein 1 is in the range of 1 to 20 and n is in the range of 1 to 10 are included as blocks.

In average formula (2), $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, an aromatic hydrocarbon group of 6 to 10 carbon atoms or a hydroxyl group. Preferred substituted or unsubstituted, monovalent aliphatic unsaturated hydrocarbon groups of 2 to 8 carbon atoms are alkenyl groups, with vinyl being most preferred. $R^4$ may contain a branched structure because a further improvement in adhesion is expectable.

Specifically, suitable groups of $R^4$ include alkyl groups such as methyl, ethyl, propyl, isopropyl, butyl, isobutyl, tert-butyl, hexyl and cyclohexyl; alkenyl groups such as vinyl, allyl, propenyl, and butenyl; aryl groups such as phenyl and tolyl; and aralkyl groups such as benzyl and phenylethyl. $R^4$ may be hydroxyl as well.

In average formula (2), the subscript d is equal to 0, 1 or 2 as mentioned above. It is preferred for a further improvement in adhesion that the second organopolysiloxane of formula (2) contain a branched structure. This gives preference to the organopolysiloxane of formula (2) wherein d is equal to 0 or 1. It is noted that in the case of d=0, $R^4_d SiO_{(4-d)/2}$ units become $SiO_2$ units (Q units), and in the case of d=1, the same become $R^4 SiO_{3/2}$ units (T units).

An appropriate amount of the second organopolysiloxane (C) blended is 0.1 to 10 parts, preferably 1 to 7 parts by weight per 100 parts by weight of the first organopolysiloxane (A). Too small amounts of the second organopolysiloxane achieve insufficient adhesion whereas more than 10 parts by weight of the second organopolysiloxane can result in a reduced rubber plasticity and a rubber hardness substantially deviating from the compounding design.

Component E

For further improving adhesion, (E) an organosilane of the general formula (3):

$$XSi(CH_3)_e Y_{(3-e)} \quad (3)$$

wherein X is a functional group other than alkoxy, Y is an alkoxy group, and e is an integer of 0 to 2, having a viscosity of up to 100 mPa·s at 25° C. may be compounded alone or in admixture of two or more.

Specifically, the functional groups of X include (meth) acryloyl-containing groups, amino-containing groups and epoxy-containing groups, such as represented by Z-$(CH_2)_x$— wherein Z is an acryloyl, methacryloyl, acryloyloxy, methacryloyloxy, amino, aminoalkylamino, glycidyl, glycidyloxy, epoxycyclohexyl, epoxycyclohexyloxy or mercapto group, and x is a number from 0 to 6, preferably 2 to 4, typically 3. The alkoxy groups of Y are preferably those of 1 to 6 carbon atoms, such as methoxy and ethoxy.

Specific examples of the silane having formula (3) include 3-methacryloyloxypropyltrimethoxysilane, 3-glycidoxypropyltrimethoxysilane, 2-(3,4-epoxycyclohexyl)ethylmethoxysilane, N-(2-aminoethyl)-3-aminopropyltrimethoxysilane, N-(2-aminoethyl)-3-aminopropylmethyldimethoxysilane, and 3-aminopropyltriethoxysilane, which are commonly used as silane coupling agents.

The organosilane (E) should have a viscosity of equal to or less than 100 mPa·s at 25° C. and preferably 0.1 to 100 mPa·s at 25° C. Outside the range, the organosilane may become less dispersive in the composition, failing to assist in adhesion.

An appropriate amount of the organosilane (E) blended is 0.1 to 10 parts, preferably 0.1 to 5 parts by weight per 100 parts by weight of the first organopolysiloxane (A). More than 10 parts by weight of the organosilane can cause a reduction of rubber physical properties and interfere with vulcanization.

Component D

Component (D) is a cure catalyst. The fluorosilicone rubber composition having the cure catalyst added thereto can be vulcanized and cured into a cured part by any standard technique. For vulcanization and cure, any of well-known cure catalysts, preferably organic peroxides may be used. Examples of the peroxide include benzoyl peroxide, tert-butyl perbenzoate, o-methylbenzoyl peroxide, p-methylbenzoyl peroxide, di-tert-butyl peroxide, dicumyl peroxide, 1,1-bis(tert-butylperoxy)-3,3,5-trimethylcyclohexane, 2,5-dimethyl-2,5-di(tert-butylperoxy)hexane, and 2,5-dimethyl-2,5-di(tert-butylperoxy)hexyne, alone or in admixture of two or more.

The cure catalyst is used in a catalytic amount to induce cure. Typically, about 0.1 to 5 parts by weight of an organic peroxide is used per 100 parts by weight of the first organopolysiloxane (A).

Addition reaction cure is also acceptable, which uses as the curing agent a platinum group catalyst in combination with an organohydrogenpolysiloxane having at least two silicon-bonded hydrogen atoms. The platinum group catalyst is preferably used in such amounts as to give about 1 to 2,000 ppm of platinum metal based on the first organopolysiloxane (A). The organohydrogenpolysiloxane is preferably used in such amounts that about 0.5 to 5 SiH groups in the organohydrogenpolysiloxane are available per aliphatic unsaturated hydrocarbon group in the first organopolysiloxane (A). The combination of a platinum group catalyst with an organohydrogenpolysiloxane may be any of the combinations well known for use in addition reaction curing silicone rubber compositions.

In the fluorosilicone rubber composition of the invention, various additives may be added if necessary, for example, fillers such as non-reinforcing silica (e.g., ground quartz and diatomaceous earth), carbon black (e.g., acetylene black, furnace black and channel black), and calcium carbonate, colorants, heat resistance improvers, flame retardants, acid acceptors, heat transfer improvers, mold release agents, and dispersants (e.g., alkoxysilanes, diphenylsilane diols, carbon functional silanes and silanol end-capped low molecular weight siloxanes).

The fluorosilicone rubber composition is obtainable by intimately mixing the above-described components on a rubber milling machine such as a twin-roll mill, Banbury mixer, dough mixer or kneader. The recommended procedure is by premixing components (A) and (B) to form a base compound, optionally heat treating the base compound, and adding the remaining components (C), (D) and (E) thereto.

It is not critical how to mold the fluorosilicone rubber composition. It may be molded into rubber parts of any desired shape such as 0-rings, diaphragms and gaskets by any of conventional rubber molding methods such as compression molding, transfer molding, injection molding, extrusion molding, and calender molding. The preferred molding method which is applicable to the inventive composition is extrusion molding or calender molding combined with low-pressure vulcanization such as steam vulcanization or hot air vulcanization (HAV). If necessary, secondary vulcanization may be effected at 180 to 250° C. for about 1 to 10 hours.

In a preferred embodiment, the fluorosilicone rubber composition of the invention is used in lamination or blend with dimethylsilicone rubber. A molded rubber article is provided comprising a first silicone rubber layer resulting from curing of a fluorosilicone rubber composition and a second silicone rubber layer laid thereon resulting from curing of a dimethylsilicone rubber composition.

The dimethylsilicone rubber composition used herein may be of either the addition reaction cure type or the organic peroxide cure type. For the addition reaction cure type, use may be made of dimethylsilicone rubber compositions comprising a dimethylpolysiloxane polymer containing, on average, at least two alkenyl groups (typically vinyl) in a molecule as the base, an organohydrogenpolysiloxane having at least two SiH groups in a molecule as the crosslinking agent, and a platinum based catalyst as the addition reaction catalyst. For the organic peroxide cure type, use may be made of dimethylsilicone rubber compositions comprising an organopolysiloxane containing, on average, at least two alkenyl groups (typically vinyl) in a molecule as the base and an organic peroxide as the catalyst.

In one embodiment, an organopolysiloxane of the average formula (2) having a viscosity of up to 2,000 mPa·s at 25° C. is compounded in the fluorosilicone rubber composition as described above. In an alternative embodiment, the organopolysiloxane of formula (2) is compounded in the dimethylsilicone rubber composition, and the fluorosilicone rubber composition to be combined therewith may be free of the organopolysiloxane of formula (2). It is acceptable that the organopolysiloxane of formula (2) be compounded in both the silicone rubber compositions.

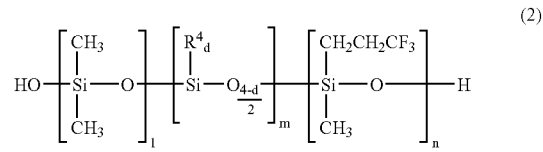

(2)

Herein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, an aromatic hydrocarbon group of 6 to 10 carbon atoms or a hydroxyl group, d is an integer of 0 to 2, 1, m and n are each independently a positive number.

The molded rubber article of the invention can be manufactured as follows. One procedure involves forming the fluorosilicone rubber composition having the above-mentioned components admixed into a sheet form, then heat curing to form a fluorosilicone rubber layer, coating the dimethyl silicone rubber composition onto the rubber layer and then heat curing to form a dimethylsilicone rubber layer. Another procedure involves preforming a dimethylsilicone rubber layer, forming a layer of the fluorosilicone rubber composition thereon, and curing.

In an alternative procedure, the dimethylsilicone rubber composition is disposed on a sheet form of the fluorosilicone rubber composition and the assembly is heat cured and co-vulcanized. Suitable heat curing conditions include heating at 150 to 180° C. for 5 to 30 minutes. In this regard, a molding process capable of applying a certain pressure during molding allows for interfacial co-vulcanization to achieve co-adhesion, with the reduced likelihood of interfacial separation. However, steam vulcanization and HAV using a low pressure during molding are more adequate in the molding of hoses. The invention is more effective in steam vulcanization and HAV because the likelihood of interfacial separation is restrained even when the pressure applied during molding is as low as about 0.1 to 3 MPa. The molded rubber articles of the invention are thus suited as hoses, specifically automobile hoses, especially turbocharger hoses of two-layer structure of fluorosilicone rubber and dimethylsilicone rubber.

The molded rubber articles are desirably manufactured such that when the fluorosilicone rubber composition and the dimethylsilicone rubber composition are co-vulcanized, for example, under a molding pressure of 1 MPa, there is established a bond strength (or peeling force) of at least 0.5 MPa between the fluorosilicone and dimethylsilicone rubber layers after curing, or a bond strength of at least 2-fold the bond strength achievable by fluorosilicone rubber compositions free of component (C) or (E) under the same molding conditions.

EXAMPLE

Examples of the invention are given below by way of illustration and not by way of limitation. All parts are by weight. The viscosity is as measured at 25° C. by a rotational viscometer.

Examples 1-8 & Comparative Examples 1-5

Base compounds I to III were prepared by the following procedure.

Base compound I:

A base compound I was prepared by adding 20 parts of dry silica (Aerosil 200 by Nippon Aerosil Co., Ltd.) and 4 parts of diphenylsilane diol as a dispersant to 100 parts of an organopolysiloxane A1 represented by the following formula (9), uniformly mixing them, heat treating the blend at 150° C. for 4 hours, and milling the blend on a twin-roll mill for plasticization.

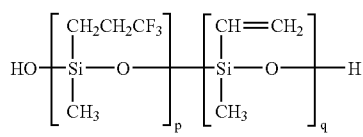
(9)

In formula (9), p is 99.7±0.05 mol %, and q is a positive number giving a vinyl content of 0.3±0.05 mol % based on the entire silicon-bonded organic groups.

Base compound II:

A base compound II was prepared by adding 25 parts of dry silica (Aerosil 200 by Nippon Aerosil Co., Ltd.) and 6 parts of diphenylsilane diol as a dispersant to 100 parts of the organopolysiloxane A1 represented by the formula (9), uniformly mixing them, heat treating the blend at 150° C. for 4 hours, and milling the blend on a twin-roll mill for plasticization.

It is noted that the organopolysiloxane A1 has a degree of polymerization of 2,000 to 4,000.

Base compound III:

A base compound III was prepared by adding 25 parts of dry silica (Aerosil 300 by Nippon Aerosil Co., Ltd.) and 5 parts of diphenylsilane diol as a dispersant to 100 parts of an organopolysiloxane A2 represented by the following formula (10), uniformly mixing them, heat treating the blend at 150° C. for 4 hours, and milling the blend on a twin-roll mill for plasticization. It is noted that the organopolysiloxane A2 has a degree of polymerization of 2,000 to 4,000.

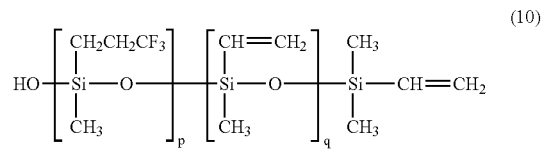
(10)

In formula (10), p is 99.85±0.03 mol %, and q is a positive number giving a vinyl content of 0.15±0.03 mol % based on the entire silicon-bonded organic groups.

Next, on a twin-roll mill, base compound I, II or III was compounded with an organopolysiloxane C1 and an organosilane E1 or E2 in amounts as shown in Tables 1 and 2, yielding a fluorosilicone rubber composition. It is noted that the organopolysiloxane C1 has a viscosity of 110 mPa·s at 25° C. and both the organosilanes E1 and E2 have a viscosity of up to 100 mPa·s at 25° C.

Organopolysiloxane C1

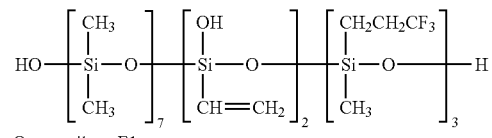

Organosilane E1

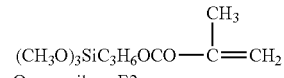

Organosilane E2

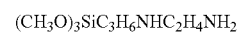

The fluorosilicone rubber compositions thus obtained were examined for initial physical properties and adhesion by the following tests.

Initial physical properties

On a twin-roll mill, 100 parts of the above fluorosilicone rubber composition was compounded with 0.8 part of a paste containing 80% 2,5-dimethyl-2,5-di(tert-butylperoxy)hexane. For physical properties measurement, the resulting composition was press molded at 165° C. for 10 minutes and post-cured at 200° C. for 4 hours, forming a sheet of 2 mm thick. The initial physical properties of this sheet were measured according to JIS K6249.

Adhesion test

A fluorosilicone rubber composition having a vulcanizing agent compounded therein was sheeted by means of a twin-roll mill into a strip of 25 mm×175 mm×1.0-1.2 mm thick. On the fluorosilicone rubber strip, a Teflon sheet of 25 mm×90 mm×0.2 mm thick was laid with one edge in register. A dimethylsilicone rubber composition was sheeted into a strip of 25 mm×175 mm×1.0-1.2 mm thick, which was laid on the fluorosilicone rubber strip partially via the Teflon sheet. The assembly was press vulcanized under the molding conditions shown in Tables 1 and 2, forming a test sample. In this test sample, portions of the fluorosilicone rubber layer and the dimethylsilicone rubber layer were separated by the Teflon sheet. A bond strength (kN/m) was determined by using a tensile tester, securing the separated portions of the fluorosilicone rubber layer and the dimethylsilicone rubber layer, and pulling them apart in opposite directions at a constant speed of 50 mm/min until rupture. The peeling mode was observed and rated in Tables 1 and 2 as ○ for partial cohesive failure, ⊚ for entire cohesive failure (both are acceptable adhesion), and X for interfacial peeling (poor adhesion).

The fluorosilicone rubber composition having a vulcanizing agent compounded therein was obtained by compounding on a twin-roll mill 100 parts of the above-mentioned fluorosilicone rubber composition with 0.8 part of a paste containing 80% 2,5-dimethyl-2,5-di(tert-butylperoxy)hexane as a vulcanizing agent.

The dimethylsilicone rubber composition used was obtained by adding 5 parts of vinyltrimethoxysilane and 2 parts of dimethylpolysiloxane as dispersants and 35 parts of dry silica (Aerosil 200 by Nippon Aerosil Co., Ltd.) as a filler to 100 parts of a gum-like organopolysiloxane composed mainly of dimethylsiloxane units and having a vinyl content of about 0.11 mol % ascribed to methylvinylsiloxane and dimethylvinylsiloxane units and an average degree of polymerization of about 5,000, and heat treating the blend at 170° C. for 2 hours to form a compound IV. On a twin-roll mill, 100 parts of compound IV was compounded with 0.6 part of a paste containing 80% 2,5-dimethyl-2,5-di(tert-butylperoxy)hexane.

TABLE 1

| | Comparative Example | | | Example | | | |
| --- | --- | --- | --- | --- | --- | --- | --- |
| | 1 | 2 | 3 | 1 | 2 | 3 | 4 |
| Composition (pbw) | | | | | | | |
| Base compound I | 100 | 100 | 100 | 100 | 100 | 100 | 100 |
| Organopolysiloxane C1 | | | | 2 | 5 | 5 | 5 |
| Organosilane E1 | | | | | | 1 | |
| Organosilane E2 | | | | | | | 1 |
| Initial physical properties | | | | | | | |
| Hardness (Durometer A) | 40 | 40 | 40 | 41 | 43 | 45 | 43 |
| Tensile strength (MPa) | 8.5 | 8.4 | 8.3 | 8.0 | 7.9 | 7.8 | 7.6 |
| Elongation at break (%) | 450 | 440 | 450 | 420 | 400 | 390 | 490 |
| Adhesion test | | | | | | | |
| Sample molding conditions | | | | | | | |
| Temperature | 170° C. | 170° C. | 120° C. | 170° C. | 170° C. | 170° C. | 170° C. |
| Time | 10 min | 10 min | 20 min | 10 min | 10 min | 10 min | 10 min |
| Pressure (MPa) | 10 | 1 | 1 | 1 | 1 | 1 | 1 |
| Bond strength (kN/m) to dimethylsilicone rubber layer | 0.20 | 0.08 | 0.16 | 0.28 | 0.32 | 0.56 | 0.64 |
| Peeling mode | X | X | X | ○ | ○ | ○ | ⊚ |
| Remarks | high-pressure molding | | low-temperature molding | | | | |

TABLE 2

| | Comparative Example | Example | | Comparative Example | Example | |
| --- | --- | --- | --- | --- | --- | --- |
| | 4 | 5 | 6 | 5 | 7 | 8 |
| Composition (pbw) | | | | | | |
| Base compound II | 100 | 100 | 100 | | | |
| Base compound III | | | | 100 | 100 | 100 |
| Organopolysiloxane C1 | | 5 | 5 | | 5 | 5 |
| Organosilane E1 | | | 1 | | | 1 |
| Initial physical properties | | | | | | |
| Hardness (Durometer A) | 60 | 63 | 65 | 40 | 43 | 45 |
| Tensile strength (MPa) | 9.5 | 9.0 | 8.8 | 12.8 | 10.0 | 9.2 |
| Elongation at break (%) | 420 | 390 | 370 | 560 | 540 | 520 |
| Adhesion test | | | | | | |
| Sample molding conditions | | | | | | |
| Temperature | 170° C. | 170° C. | 170° C. | 170° C. | 170° C. | 170° C. |
| Time | 10 min | 10 min | 10 min | 10 min | 10 min | 10 min |
| Pressure (MPa) | 1 | 1 | 1 | 1 | 1 | 1 |
| Bond strength (kN/m) to dimethylsilicone rubber layer | 0.08 | 0.32 | 0.56 | 0.08 | 0.32 | 0.56 |
| Peeling mode | X | ○ | ○ | X | ○ | ○ |

The results of Tables 1 and 2 demonstrate that when the fluorosilicone rubber composition of the invention was co-vulcanized with a dimethylsilicone rubber composition, it achieved a bond strength (peeling force) of at least two-fold greater than the bond strength achievable with similar fluorosilicone rubber compositions free of component (C) or (E) under the same molding conditions. That is, the fluorosilicone rubber composition of the invention affords satisfactory adhesion at the interface with dimethylsilicone rubber. As compared with the high-pressure molding process (Comparative Example 1), the bond strength to dimethylsilicone rubber was high. That is, the fluorosilicone rubber composition of the invention affords satisfactory adhesion at the interface with dimethylsilicone rubber even when the molding pressure is low. When the fluorosilicone rubber composition of the invention was blended with a dimethylsilicone rubber composition, a minimized likelihood of delamination in microscopic regions was confirmed.

Japanese Patent Application No. 2005-157161 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A molded rubber article comprising a fluorosilicone rubber and a dimethylsilicone rubber laid thereon, wherein one or both of the rubber compositions of which the fluorosilicone rubber and the dimethylsilicone rubber are made comprise an organosiloxane having the average formula (2):

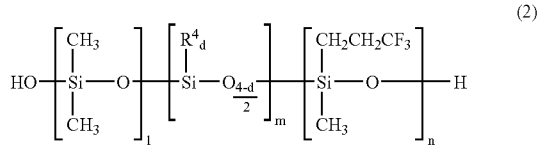

(2)

wherein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, or an aromatic hydrocarbon group of 6 to 10 carbon atoms, d is an integer of 0 or 1, 1, m and n are each independently a positive number in the range of 1 to 50, said organosiloxane having a viscosity of up to 2,000 mPa·s at 25° C.

2. The molded rubber article of claim 1, wherein the organosiloxane of formula (2) is incorporated in the rubber composition of which the fluorosilicone rubber is made.

3. The molded rubber article of claim 1, wherein the organosiloxane of formula (2) is incorporated in the rubber composition of which the dimethylsilicone rubber is made.

4. The molded rubber article of claim 3, wherein when the organopolysiloxane of formula (2) is compounded in the dimethylsilicone rubber composition, a moiety of the following structural formula (8) provides the dimethylsilicone rubber with a greater affinity to fluorosilicone rubber at the interface between fluorosilicone rubber and dimethylsilicone rubber:

(8)

where n is a positive number in the range of 1 to 50.

5. The molded rubber article of claim 1, wherein the organosiloxane of formula (2) is incorporated in both of the rubber compositions of which the fluorosilicone rubber and the dimethylsilicone rubber are made.

6. The molded rubber article of claim 1, wherein the fluorosilicone rubber is a cured product of a fluorosilicone rubber composition comprising (A) 100 parts by weight of a first organopolysiloxane having the average compositional formula (1):

$R^1_a R^2_b R^3_c SiO_{(4-1-b-c)/2}$ (1)

wherein $R^1$ is trifluoropropyl, $R^2$ is a substituted or unsubstituted, monovalent aliphatic unsaturated hydrocarbon group of 2 to 8 carbon atoms, $R^3$ is an unsubstituted, monovalent aliphatic saturated hydrocarbon group of 1 to 8 carbon atoms or an aromatic hydrocarbon group, a, b and c are positive numbers satisfying $0.96 \leq a \leq 1.01$, $0.0001 \leq b \leq 0.005$, $0.96 \leq c \leq 1.06$, and $1.98 \leq a+b+c \leq 2.02$, said first organopolysiloxane having a degree of polymerization of 500 to 20,000, (B) 2 to 100 parts by weight of a silica filler, (C) 0.1 to 10 parts by weight of a second organopolysiloxane having the average formula (2):

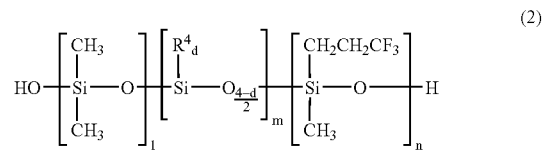

(2)

wherein $R^4$ is each independently a substituted or unsubstituted, monovalent aliphatic unsaturated hydrocarbon group of 2 to 8 carbon atoms, an unsubstituted, monovalent aliphatic saturated hydrocarbon group of 1 to 8 carbon atoms, or an aromatic hydrocarbon group of 6 to 10 carbon atoms, d is an integer of 0 or 1, 1, m and n are each independently a positive number in the range of 1 to 50, said second organopolysiloxane having a viscosity of up to 2,000 mPa·s at 25° C., and (D) a catalytic amount of a cure catalyst.

7. The molded rubber article of claim 6, wherein a moiety of the following structural formula (5) of the second organopolysiloxane of formula (2) has an affinity to dimethylpolysiloxane:

(5)

where 1 is a positive number in the range of 1 to 50.

8. The molded rubber article of claim 6, wherein a moiety of the following structural formula (6) of the second organopolysiloxane of formula (2) has an affinity to the first organopolysiloxane having trifluoropropyl groups:

(6)

where n is a positive number in the range of 1 to 50.

9. The molded rubber article of claim 6, wherein when the second organopolysiloxane of formula (2) is compounded in the fluorosilicone rubber composition, a moiety of the following structural formula (7) provides the fluorosilicone rubber with a greater affinity to dimethylsilicone rubber at the interface between fluorosilicone rubber and dimethylsilicone rubber:

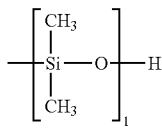     (7)

where 1 is a positive number in the range of 1 to 50.

10. The molded rubber article of claim 1, wherein the fluorosilicone rubber composition further comprises
(E) 0.1 to 10 parts by weight of an organosilane having the general formula (3):

$$XSi(CH_3)_e Y_{(3-e)} \quad (3)$$

wherein X is a functional group other than alkoxy, Y is an alkoxy group, and e is an integer of 0 to 2, said organosilane having a viscosity of up to 100 mPa·s at 25° C.

11. A molded rubber article comprising a fluorosilicone rubber and a dimethylsilicone rubber laid thereon, wherein one or both of the rubber compositions of which the fluorosilicone rubber and the dimethylsilicone rubber are made comprise an organosiloxane having the following formula and a viscosity of up to 2,000 mPa·s at 25° C.:

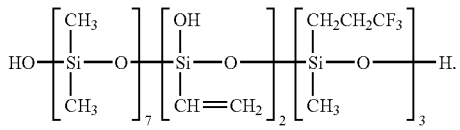

12. The molded rubber article of claim 11, wherein the fluorosilicone rubber is a cured product of a fluorosilicone rubber composition comprising
(A) 100 parts by weight of a first organopolysiloxane having the average compositional formula (9):

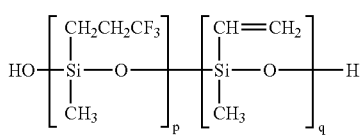     (9)

wherein p is 99.7±0.05 mol %, and q is a positive number giving a vinyl content of 0.3±0.05 mol % based on the entire silicon-bonded organic groups, (B) 2 to 100 parts by weight of a silica filler,
(C) 0.1 to 10 parts by weight of a second organopolysiloxane having the following formula and a viscosity of 110 mPa·s at 25° C.:

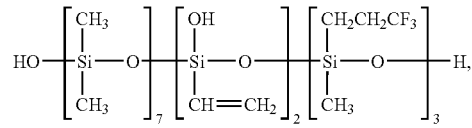

(D) a catalytic amount of a cure catalyst, and
(E) 0.1 to 10 parts by weight of an organosilane having the following formula:

$$(CH_3O)_3SiC_3H_6NHC_2H_4NH_2$$

13. The molded rubber article of claim 11, wherein the fluorosilicone rubber is a cured product of a fluorosilicone rubber composition comprising
(A) 100 parts by weight of a first organopolysiloxane having the average compositional formula (10):

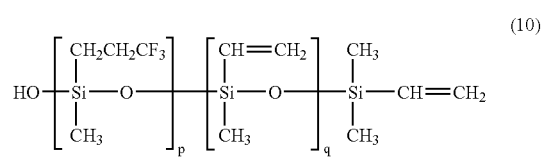     (10)

wherein p is 99.85±0.03 mol %, and q is a positive number giving a 0.3±0.005 mol % based on the entire silicon-bonded organic groups,
(B) 2 to 100 parts by weight of a silica filler,
(C) 0.1 to 10 parts by weight of a second organopolysiloxane having the following formula and a viscosity of 110 mPa·s at 25° C.:

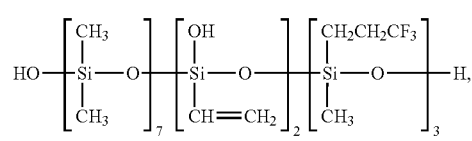

(D) a catalytic amount of a cure catalyst, and
(E) 0.1 to 10 parts by weight of an organosilane having the following formula:

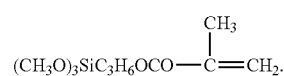

* * * * *